(12) United States Patent
Bae et al.

(10) Patent No.: US 7,781,516 B2
(45) Date of Patent: *Aug. 24, 2010

(54) FLAME RETARDANT POLYMER COMPOSITION

(75) Inventors: Su Hak Bae, Seoul (KR); Jae Ho Yang, Gunpo-si (KR); Sang Hyun Hong, Gunpo-si (KR)

(73) Assignee: Cheil Industries Inc., Gyungsangbuk-do (KR)

( * ) Notice: Subject to any disclaimer, the term of this patent is extended or adjusted under 35 U.S.C. 154(b) by 1122 days.

This patent is subject to a terminal disclaimer.

(21) Appl. No.: 11/354,564

(22) Filed: Feb. 14, 2006

(65) Prior Publication Data

US 2006/0189729 A1 Aug. 24, 2006

Related U.S. Application Data

(63) Continuation-in-part of application No. PCT/KR03/02689, filed on Dec. 9, 2003.

(30) Foreign Application Priority Data

Aug. 14, 2003 (KR) ............... 10-2003-0056524

(51) Int. Cl.
*C08K 5/49* (2006.01)
(52) U.S. Cl. .............. 524/710; 524/508; 524/583; 526/328; 526/329.2; 526/329.3; 526/335
(58) Field of Classification Search .............. 526/328, 526/329.3, 329.2, 335; 524/508, 583, 710
See application file for complete search history.

(56) References Cited

U.S. PATENT DOCUMENTS

| | | | |
|---|---|---|---|
| 3,849,368 A | 11/1974 | Anderson et al. | |
| 4,397,759 A | 8/1983 | Hancock | |
| 4,459,381 A | 7/1984 | Trivedi | |
| 4,618,633 A | 10/1986 | Taubitz | |
| 4,632,946 A | 12/1986 | Muench | |
| 5,030,674 A | 7/1991 | Notorgiacomo | |
| 6,054,515 A | 4/2000 | Blount | |
| 6,262,166 B1 | 7/2001 | Yoshida et al. | |
| 6,306,941 B1 | 10/2001 | Klatt et al. | |
| 2006/0183825 A1 | 8/2006 | Ahn et al. | |
| 2006/0183826 A1 | 8/2006 | Ryu et al. | |
| 2006/0189730 A1 | 8/2006 | Hong et al. | |

FOREIGN PATENT DOCUMENTS

| | | | |
|---|---|---|---|
| DE | 42 09 029 A1 | | 9/1993 |
| DE | 19 637 368 | | 3/1998 |
| EP | 0 075 863 | * | 4/1983 |
| EP | 1 069 157 A1 | | 7/2001 |
| EP | 1 262 519 | | 12/2002 |
| GB | 2 003 888 | | 3/1979 |
| JP | 60-079048 A | | 5/1985 |
| JP | 61009450 | | 1/1986 |
| JP | 10-195287 | * | 7/1998 |
| JP | 10-195287 A | | 7/1998 |
| KR | 2001-0083602 A | | 9/2001 |
| WO | WO 2004 029143 | | 4/2004 |

OTHER PUBLICATIONS

Abstract of DE 4209029 published Sep. 23, 1993.
European Search Report completed Aug. 7, 2006 (for commonly owned EP application).
Abstract XP002393756 which relates to Abstract of JP 61009450 published Jan. 17, 1986.
Abstract of JP 61009450 published Jan. 17, 1986.
European Search Report for related application completed Mar. 12, 2007 with Annex.
Co-pending U.S. Appl. No. 11/416,870, filed May 2, 2006, titled Flame Retardant Polymer Composition, and assigned to the assignee of this application.
Partial International Search Report dated Apr. 27, 2004 for International Application No. PCT/KR2003/002689, filed Dec. 9, 2003.

* cited by examiner

*Primary Examiner*—Ling-Siu Choi
(74) *Attorney, Agent, or Firm*—Maria Parrish Tungol

(57) ABSTRACT

A polymer composition includes a rubber modified vinyl resin, a cyclic alkyl phosphate compound, and an aromatic phosphate ester. Some embodiments may additionally comprises a polyphenylene ether resin. In some embodiments, the compositions have good flame retardancy, color stability, impact resistance, and thermal stability.

22 Claims, No Drawings

FLAME RETARDANT POLYMER COMPOSITION

CROSS-REFERENCE TO RELATED APPLICATIONS

This application is a continuation-in-part application under 35 U.S.C. §365 (c) claiming the benefit of the filing date of PCT Application No. PCT/KR2003/002689 designating the United States, filed Dec. 9, 2003. The PCT Application was published in English as WO 2005/017030 A1 on Feb. 24, 2005, and claims the benefit of the earlier filing date of Korean Patent Application No. 10-2003-0056524, filed Aug. 14, 2003. The contents of the PCT Application including its international publication and Korean Patent Application No. 10-2003-0056524 are incorporated herein by reference in their entirety.

BACKGROUND

1. Field

The invention relates to a flame retardant polymer composition comprising a rubber modified aromatic vinyl resin employing a cyclic alkyl phosphate compound.

2. Description of the Related Art

Rubber modified styrenic resins are excellent in mold processability and mechanical properties and therefore have been widely applied to electric or electronic goods and office supplies. However, one disadvantage is that the styrenic resin is easily flammable. Therefore, methods for improving flame retardancy of rubber-modified styrenic resins have been developed.

A widely known method for imparting flame retardancy to polymer resins is the addition of a halogen-containing compound. Examples of halogen-containing compounds include polybromodiphenyl ether, tetrabromobisphenol-A, and epoxy compounds substituted by bromine. However, halogen-containing compounds may corrode the mold by releasing hydrogen halide gases during the molding process of the polymer resins. They may also be fatally harmful due to the toxic gases liberated in the case of fire. For example, a polybromodiphenyl ether can produce toxic gases such as dioxin or difuran during combustion. Therefore, a goal in this field is to develop a flame retardant polymer composition ared without a halogen-containing compound.

SUMMARY OF THE INVENTION

In some embodiments, a polymer composition comprises a rubber modified vinyl resin and a cyclic alkyl phosphate compound.

According to some embodiments, a polymer composition comprises a rubber modified vinyl resin, a cyclic alkyl phosphate compound represented by Formula (I):

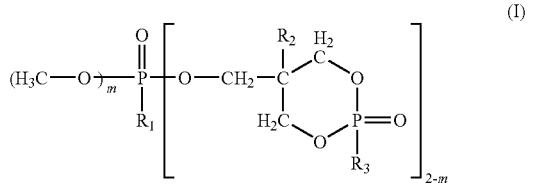

an aromatic phosphate ester represented by Formula (II):

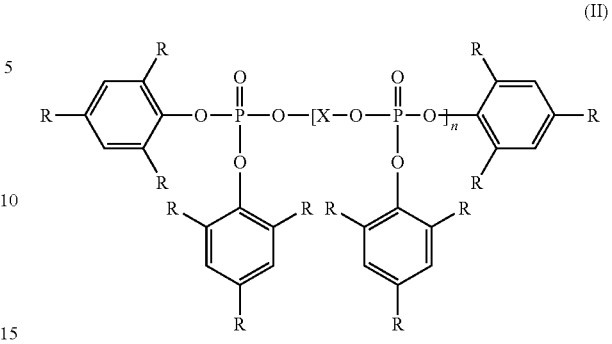

In Formula (I), $R_1$, $R_2$, and $R_3$ are independently substituted or unsubstituted $C_{1-4}$ alkyl, and m is an integer of 0 or 1.

In Formula (II), R is independently hydrogen or $C_{1-4}$ alkyl. In some embodiments, X is derived from an aryl compound comprising one or more hydroxy groups. In embodiments, n is an integer of 0, 1, 2, 3, or 4.

In some embodiments, the rubber modified aromatic vinyl resin is about 70 to about 100 parts by weight, the cyclic alkyl phosphate compound is about 0.1 to 10 parts by weight, and the aromatic phosphate ester compound is about 0.1 to about 10 parts by weight.

In some embodiments, the aryl compound comprising two hydroxyl groups is selected from the group consisting of resorcinol, hydroquinone, bisphenol-A. In other embodiments, X is selected from arylene or a compound comprising more than one aryl group.

In several embodiments, the rubber modified vinyl resin is a rubber modified styrenic resin. In some embodiments, the rubber modified vinyl resin comprises a copolymer having a repeating unit of a rubber and at least one repeating unit of a monomer selected from an aromatic mono-alkenyl monomer and an alkyl ester monomer of acrylic or methacrylic acid.

In certain embodiments, the composition further comprises a polyphenylene ether resin. The polyphenylene ether resin may be about 0.1 to about 20 parts by weight, per about 70 to about 100 parts by weight of the rubber modified vinyl resin.

In embodiments, the cyclic phosphate ester compound is methyl-bis(5-ethyl-2-methyl-1,3,2-dioxaphorinan-5-yl) methyl methyl phosphonic acid ester P-oxide or methyl-bis(5-ethyl-2-methyl-1,3,2-dioxaphorinan-5-yl) phosphonic acid ester P, P'-dioxide.

In some embodiments, the composition is formed in a shaped article. These compositions can additionally comprise the polyphenylene ether resin.

In some embodiments, the article has a flame retardancy of V-2, V-1, or V-0 when a specimen of the article is tested under the standard UL-94VB (⅛"). In some of these embodiments and in other embodiments, the article has impact strength greater than or equal to about 10 kgf·cm/cm when a specimen of the article is tested under the standard ASTM D-256 A (⅛" notched) at 23° C.

In some embodiments, the article has impact strength greater than or equal to about 12 kgf·cm/cm when a specimen of the article is tested under the standard ASTM D-256 A (⅛" notched) at 23° C. In other embodiments, the article has impact strength greater than or equal to about 14 kgf·cm/cm when a specimen of the article is tested under the standard ASTM D-256 A (⅛" notched) at 23° C.

In one embodiment, the article has Vista Softening Temperature greater than or equal to about 79° C. when a specimen of the article is tested under the standard ASTM D-1525 under a 5 kg load.

In another embodiment, the article has Vicat Softening Temperature greater than or equal to about 84° C. when a specimen of the article is tested under the standard ASTM D-1525 under a 5 kg load.

Still, in other embodiments, the article has Vicat Softening Temperature greater than or equal to about 89° C. when a specimen of the article is tested under the standard ASTM D-1525 under a 5 kg load.

Additionally, articles of some embodiments have ΔE less than about 0.4 when a specimen of the article is tested under the standard ASTM-D4459.

In some embodiments, the polymer compositions are used in electronic devices. In one embodiment, an electronic device comprises an electrical circuit and a housing enclosing at least part of the electrical circuit, the housing comprising a portion, which comprises the composition of some embodiments. The composition used in the portion may further comprises a polyphenylene ether resin.

In some embodiments, the portion has flame retardancy of V-2, V-1, or V-0 when tested under the standard UL-94VB (⅛"). In other embodiments, the portion has ΔE less than about 0.35 when tested under the standard ASTM-D4459. Still, in other embodiments, the portion has ΔE less than or equal to about 0.3 when tested under the standard ASTM-D4459. In a few embodiments, the portion has ΔE less than or equal to about 0.2 when tested under the standard ASTM-D4459

Another embodiment includes a method of making an electronic device, comprising providing an electrical circuit, providing a housing comprising a portion; and enclosing at least part of the electrical circuit with the housing, wherein the portion comprises the composition of embodiments as described herein.

DETAILED DESCRIPTION OF THE PREFERRED EMBODIMENT

As noted above, one aspect of this invention relates to a polymer composition. According to various embodiments, the polymer composition comprises a rubber-modified aromatic vinyl resin and cyclic alkyl phosphate compound. Some embodiments additionally comprise an aromatic phosphate ester compound as described herein. Molded articles comprising the polymer composition of the embodiments show enhanced physical or mechanical properties as compared to other compositions less one or more components. The molded articles of the embodiments also demonstrate improved flame retardancy over compositions less one or more components. As will be discussed, the molded articles according to embodiments of the invention have good flame retardancy, while maintaining excellent impact strength and thermal stability. In particular, some embodiments demonstrate improved flame retardancy and enhanced color and heat stability, as compared to other polymer compositions less one or more components.

In one embodiment, the flame retardant polymer composition can comprise a rubber modified vinyl resin, a cyclic alkyl phosphate compound, and an aromatic phosphate ester compound. One embodiment includes a cyclic alkyl phosphate compound having the following formula (I):

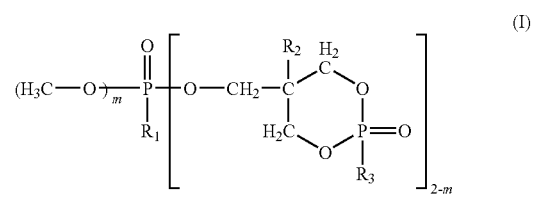

In the formula, $R_1$, $R_2$, and $R_3$ are independently selected from $C_{1-4}$ alkyl, and m is 0 or 1.

Other embodiments can further include an aromatic phosphate ester compound. This compound can be represented by formula (II):

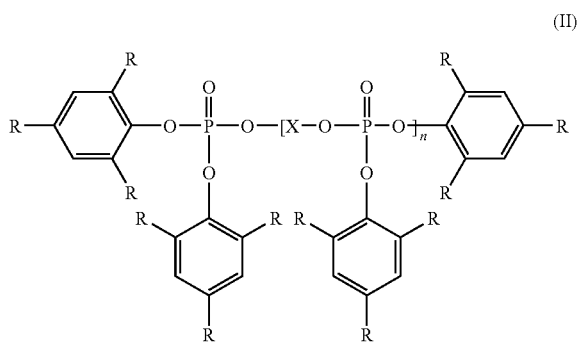

In some embodiments, each R is independently hydrogen or $C_{1-4}$ alkyl.

Some embodiments of the polymer composition additionally comprise a polyphenylene ether resin. These components are further described herein.

Rubber Modified Vinyl Resin

In some embodiments, the rubber modified vinyl resin include a copolymer of (a) at least one rubber monomer and (b) at least one aromatic mono-alkenyl monomer. In other embodiments, the rubber modified vinyl resin includes a copolymer of (a) at least one rubber monomer and (c) at least one alkyl ester monomer of acrylic acid or methacrylic acid. Further, in some embodiments, the rubber modified vinyl resin includes a copolymer of (a) at least one rubber monomer, (b) at least one aromatic mono-alkenyl monomer; and (c) at least one alkyl ester monomer of acrylic acid or methacrylic acid.

According to some embodiments, the rubber modified vinyl resin includes a copolymer comprising a rubber monomer repeating unit. To this repeating unit, another vinyl repeating unit is covalently bound. In some embodiments, this vinyl repeating unit is that of an aromatic mono-alkenyl monomer. In other embodiments, it is an alkyl ester monomer of acrylic or methacrylic acid repeating unit. Still, in further embodiments, the rubber modified vinyl resin includes a repeating unit from a rubber monomer, a repeating unit from an aromatic mono-alkenyl monomer, and a repeating unit from an alkyl ester monomer of acrylic or methacrylic acid. However, more than one form or configuration of a repeating unit can exist in the same copolymer. For example, there may be mixtures of rubber monomer repeating units, and aromatic mono-alkenyl repeating units in the same copolymer. One example is a copolymer which contains a butadiene rubber polymer core copolymerized with a styrene repeating unit and a methyl substituted styrene repeating unit.

In certain embodiments, the rubber includes butadiene rubbers, isoprene rubbers, styrene-butadiene copolymers and alkylacrylic rubbers. The amount of the rubber that can be used in some embodiments is about 3 to about 30 parts by weight, preferably about 5 to about 15 parts by weight, based on the total weight of the rubber modified vinyl resin. In other embodiments, the rubber can be in the amount of about 0, 1, 2, 3, 4, 5, 6, 7, 8, 9, 10, 11, 12, 13, 14, 15, 18, 21, 24, 27, and 30 parts by weight. In some embodiments, the rubber amount exceeds 30 parts by weight and is about 32, 34, 36, 38, and 40 parts by weight.

In embodiments, the rubber modified vinyl resin comprises one or more monomer repeating units selected from aromatic mono-alkenyl monomers and/or alkyl ester monomers of acrylic acid or methacrylic acid. In certain embodiments, the amount of the monomers is about 70 to about 97 parts by weight, preferably about 85 to about 95 parts by weight, based on the total weight of the rubber modified vinyl resin. In other embodiments, the amount of the monomers that can be used to make the copolymer are about 70, 72, 74, 76, 78, 80, 82, 84, 86, 88, 90, 92, 94, 96 and 98 parts by weight.

In some embodiments, the rubber-modified vinyl resin can be prepared by blending a rubber polymer, an aromatic mono-alkenyl monomer and/or an alkyl ester (of acrylic or methacrylic acid) monomer and polymerizing with heat or a polymerization initiator. The rubber-modified vinyl resin can be produced by a known polymerization method such as bulk polymerization, suspension polymerization, emulsion polymerization or combination thereof. Among them, bulk polymerization is preferred. The resin composition can be polymerized with heat or a polymerization initiator. The polymerization initiator may be one or more selected from the group consisting of organic peroxides such as benzoyl peroxide, t-butyl hydroperoxide, acetyl peroxide and cumene hydroperoxide or azo compounds such as azobisisobutyronitrile (AIBN).

In embodiments, the average size of rubber particles is in the range of from about 0.1 to about 6.0 μm (z-average), preferably about 0.5 to about 2 μm. In some embodiments, the rubber-modified vinyl resin is a rubber modified styrenic resin. In some embodiments, the rubber modified vinyl resins may be used as a single resin or in combination with other resins as a mixture.

"Vinyl" as used herein is a broad term that is to be interpreted according to its ordinary definition. Because a vinyl group would become incorporated into the polymer upon polymerization, the polymer may not contain an alkene. Rather, the polymer would contain a repeating unit of a vinyl resin. Vinyl encompasses styrenic resins and other aromatic vinyl resins. In addition, vinyl encompasses acrylic and methacrylic resins. Some embodiments relate to rubber modified styrenic resins formed by the use of styrenic monomers. As such, all features described herein which apply to a rubber modified vinyl resin also apply to rubber modified aromatic vinyl resins, resins containing rubber modified styrene, resins containing a rubber modified acrylic moiety, and so forth.

In some embodiments, the polymer composition comprises about 70 to about 100 parts by weight of the rubber modified vinyl resin including, but not limited to, about 70, 72, 74, 76, 78, 80, 82, 84, 86, 88, 90, 92, 94, 96, 98, and 100 parts by weight, with reference to the other components added to the polymer composition. Still, other embodiments comprise about 50 to about 70 parts by weight of the rubber modified vinyl resin including about 50, 52, 54, 56, 58, 60, 62, 64, 66, 68 parts by weight of the rubber modified vinyl resin.

Cyclic Alkyl Phosphate Compound

In certain embodiments, the rubber modified vinyl resin is used together with a cyclic alkyl phosphonate compound. In some of these embodiments, the cyclic alkyl phosphate compound is represented by the following formula:

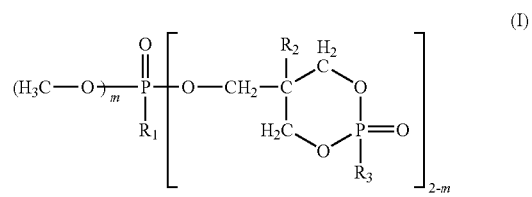

In the formula, $R_1$, $R_2$, and $R_3$ are independently selected from $C_{1-4}$ alkyl, and m is 0 or 1. For example, each of $R_1$, $R_2$, or $R_3$ can be selected from methyl, ethyl, propyl, isopropyl, butyl, sec-butyl, and tert-butyl. $R_1$, $R_2$, or $R_3$ may also be substituted or unsubstituted, which may result in some branching of the alkyl group. Substituents include, but are not limited to, halogen, $-CN$, $CF_3$, $-NO_2$, $-NH_2$, and $-OH$.

Examples of the cyclic alkyl phosphate compound include methyl-bis(5-ethyl-2-methyl-1,3,2-dioxaphorinan-5-yl) methyl methyl phosphonic acid ester P-oxide and methyl-bis(5-ethyl-2-methyl-1,3,2-dioxaphorinan-5-yl) phosphonic acid ester P, P'-dioxide.

The cyclic alkyl phosphate compound of certain embodiments can be used alone or in combination with other cyclic alkyl phosphate compound, with the total amount of about 0.1 to about 10 parts by weight, preferably 0.5 to 6 parts by weight, more preferably 0.5 to 2 parts by weight, per 70 to 100 parts by weight of the rubber modified vinyl resin. These embodiments include about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, and 10 parts by weight of the cyclic alkyl phosphate compound. Other embodiments include about 0.005, 0.05, 0.08, 12, 14, 16, 18, and 20 parts by weight of the cyclic alkyl phosphate compound.

Aromatic Phosphate Ester Compound

Some embodiments of the composition additionally comprise an aromatic phosphate ester compound. In some of these embodiments, this compound has the following structural formula:

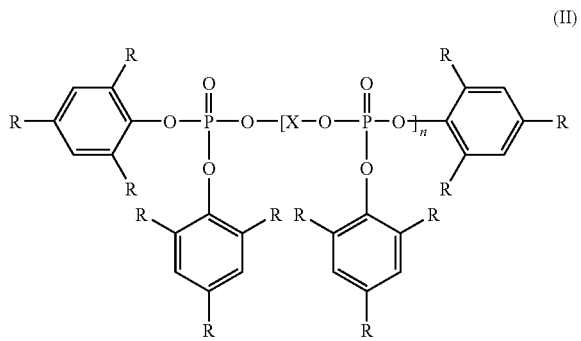

In some embodiments, each R is independently hydrogen or $C_{1-4}$ alkyl. For example, R can be methyl, ethyl, propyl, isopropyl, butyl, sec-butyl, or tert butyl. In other embodiments, the alkyl group may be substituted with one or more of halogen, alkenes, or alkyne groups. Each R may be selected independently from another R on the same or a different phenyl ring.

In certain embodiments, X is derived from a compound comprising two hydroxyaryl groups. In the compound comprising two hydroxyaryl groups, one aryl group may comprise more than one hydroxyl group. Thus, a compound comprising two hydroxyaryl groups comprises an aryl compound having two or more hydroxy groups.

For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth.

In some embodiments, n is an integer 0, 1, 2, 3 or 4. Where n is 0, the aromatic phosphate ester compound can be triphenyl phosphate, tri(2,6-dimethyl) phosphate, and the like. Where n is 1, the aromatic phosphate ester compounds include resorcinol bis(diphenyl) phosphate, resorcinol bis(2,6-dimethyl phenyl) phosphate, resorcinol bis(2,4-ditertiary butyl phenyl) phosphate, hydroquinone bis(2,6-dimethyl phenyl) phosphate, hydroquinone bis(2,4-ditertiary butyl phenyl) phosphate, and the like. The compounds can be used alone or in combination with one or more other aromatic phosphate ester compounds.

In certain embodiments, the aromatic phosphate ester compound can be used in the amount of about 0.1 to about 10 parts by weight, and more preferably from about 0.5 to about 6 parts by weight per the rubber modified vinyl resin in an amount of 70-100 parts by weight. In some embodiments, the polymer composition comprises about 0.03, 0.05, 0.08, 0.1, 0.5, 1, 1.5, 2, 2.5, 3, 3.5, 4, 4.5, 5, 5.5, 6, 6.5, 7, 7.5, 8, 8.5, 9, 9.5, and 10 parts by weight of one or more aromatic phosphate ester compounds as described above. In other embodiments, the polymer composition comprises about 11, 12, 13, 14, 15, 16, 17, 18, 19, 20, 21, 22, 23, 24, 25, 26, 27, 28, 29, 30, 31, 32, 33, 34, 35, 36, 37, 38, 39, and about 40 parts by weight of the aromatic phosphate ester.

However, some embodiments may use other phosphate esters including other aromatic phosphate esters. The phosphate esters include trialkyl derivatives such as triethyl or trioctyl phosphate, and triaryl derivatives such as triphenyl phosphate and aryl-alkyl derivatives such as 2-ethylhexyl-diphenyl phosphate. A person having ordinary skill in the art will understand other suitable phosphate esters for this application.

Polyphenylene Ether (PPE)

Polyphenylene ether has been extensively used due to its superiority in its mechanical properties, electrical properties and heat resistance and further superiority in its dimensional stability. Additionally, the polyphenylene ether may also improve the flame retardancy of the rubber modified vinyl resin. In embodiments, polyphenylene ether is an optional polymer that may be added to the polymer composition comprising the rubber modified vinyl resin, the cyclic alkyl phosphate compound, and the aromatic phosphate ester compound. In these embodiments, the polyphenylene ether may be a homopolymer and/or a copolymer including a structural unit of the following Formula:

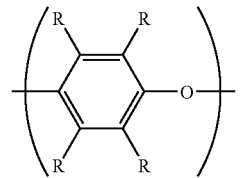

In the formula, R may independently comprise hydrogen, halogen, alkyl, aryl, substituted alkyl, substituted aryl, hydrocarbyloxy, or alkoxy. However, the polyphenylene ether is not limited to only these embodiments, and a person having ordinary skill in the art would understand many different variations of a polyphenylene ether resin.

Examples of the polyphenylene ether include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene) ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-dimethyl-1,4-phenylene)ether and poly(2,3,5-triethyl-1,4-phenylene)ether. In embodiments, copolymer of poly(2,6-dimethyl-1,4-phenylene) ether and poly(2,3,6-trimethyl-1,4-phenylene)ether. In another embodiment, poly(2,6-dimethyl-1,4-phenylene) ether is used.

A mixture of two or more polyphenylene ethers may also be used in some embodiments. The degree of polymerization of polyphenylene ether is not limited specifically. However, in some embodiments, the viscosity of polyphenylene ether or the mixture of two or more polyphenylene ethers is in the range of about 0.2 to about 0.8 g/dl measured in chloroform solvent at 25° C. However, this is merely a range, and some embodiments may extend outside this range.

In embodiments, the optional polyphenylene ether resin is used in the amount of about 0.1 to about 20 parts by weight, based on the about 70 to about 100 parts by weight of the rubber modified vinyl resin. In other embodiments, the polyphenylene ether resin is about 5 to about 10 parts by weight. Some of these embodiments of the polymer composition include about 1, 2, 3, 4, 5, 6, 7, 8, 9, 10, 11, 12, 13, 14, 15, 16, 17, 18, 19, and 20 parts by weight of a polyphenylene ether resin. Still, other embodiments use less than about 10 parts by weight of the polyphenylene ether including about 0.1, 0.5, 1, 1.5, 2, 2.5, 3, 3.5, 4, 4.5, 5, 5.5, 6, 6.5, 7, 7.5, 8, 8.5, 9, and 9.5 parts by weight.

The polymer compositions can contain one or more compounds or polymers in addition to the foregoing components. Additional components or additives may be added to provide additional properties or characteristics to the molding composition or to modify existing properties of the composition. For example, an inorganic filler such as glass fiber, carbon fiber, talc, silica, mica, and alumina may be added to improve mechanical strength and heat distortion temperature of the resin composition. In addition, the polymer composition may further include a heat stabilizer, an anti-oxidant, an ultraviolet absorbing agent, a light stabilizer, a flame retardant, a lubricant, a pigment and/or dye. In these embodiments, additives are employed in an amount of 0 to 30 parts by weight as per 100 parts by weight of rubber modified vinyl resin. One of ordinary skill in the art will appreciate that various additives may be added to the polymer compositions according to embodiments of the invention.

Preparation of Compositions

The polymer compositions can be prepared by mixing components including a rubber-modified vinyl resin, a cyclic alkyl phosphate compound, and an aromatic phosphate ester compound. In some embodiments, one or more other additives may be mixed together with the components of the polymer composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. For example, the rubber modified vinyl resin may first be mixed with the cyclic alkyl phosphate compound, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a predetermined shape and cured to form a molded article.

In some embodiments, the polymer composition comprises 70 to 100 parts by weight of a rubber-modified vinyl resin; 0.1 to 10 parts by weight of a cyclic alkyl phosphate compound; and 0.1 to 10 parts by weight of a aromatic phosphate ester compound. Some embodiments may further comprise 0 to 10 parts by weight of polyphenylene ether. However, these amounts are in no way limiting on the scope and amounts used in other embodiments as described herein.

Properties of the Compositions

An advantage of certain embodiments is to provide a flame retardant thermoplastic resin composition with good flame retardancy. Another advantage of some embodiments is to provide a flame retardant thermoplastic resin composition with good properties, such as impact strength and heat resistance. In some embodiments, one advantage is to provide an environmentally friendly and non-toxic flame retardant thermoplastic resin composition which does not contain a halogen-containing flame retardant compound.

Certain embodiments have flame retardancy of V-2, V-1, or V-0 when a specimen of the composition is tested under the standard UL-94VB with ⅛" samples. Certain embodiments have flame retardancy of at least V-2 when a specimen of the composition is tested under the standard UL-94VB with ⅛" samples. These samples may be of the composition or of formed articles comprising the compositions.

Some embodiments also have impact strength of at least about 10 kg·cm/cm, more preferably at least about 12 kg·cm/cm, and even more preferably at least about 14 kg·cm/cm, when a specimen of the composition is tested according to the standard ASTM D256 A (⅛" notched) at 23° C.

Another preferred feature of a shaped article comprising the composition in accordance with some embodiments is that it has Vicat Softening Temperature of at least about 79° C., more preferably at least about 84° C., and even more preferably at least about 89° C., when a specimen of the composition is tested according to the standard ASTM D1525 under a 5 kg load. In some embodiments, the Vicat Softening Temperature is at least about 81° C., more preferably at least about 83° C., and even more preferably at least about 87° C., when a specimen of the composition is tested according to the standard ASTM D1525.

Certain embodiments also demonstrate enhanced color stability when exposed to high temperatures. For example, one embodiments has ΔE less than or equal to about 0.35, and more preferably less than about 0.25, and even more preferably equal to or less than about 0.2 when measured in accordance with ASTM D4459 based on cream color. Some of these embodiments show enhanced color stability in conjunction with increased flame retardancy. In other embodiments which exhibit enhanced color stability, the embodiment may also demonstrate maintained or enhanced impact strength and Vicat Softening Temperature as compared to other polymer compositions less one or more components.

Shaped Articles

A shaped article can be made using the polymer composition according to the foregoing embodiments. In some embodiments, this article is molded into various shapes. An extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical devices, in which a molded article made of the blend of the composition according to embodiments of the invention are used, include printers, computers, word processors, keyboards, personal digital assistants (PDA), telephones, mobile phones, cameras, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composition comprising a rubber-modified vinyl resin and a cyclic alkyl phosphate compound. Additionally, an aromatic phosphate ester compound can be added in some embodiments of the housing or part. Some embodiments provide a method of making an electronic device, comprising providing an electrical circuit; providing a housing comprising a portion; and enclosing at least part of the electrical circuit with the housing, wherein the portion comprises the composition which comprises a rubber modified aromatic vinyl resin and a cyclic alkyl phosphate compound as described below.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the components of the polymer compositions of Examples 1-4 and Comparative Examples 1-5 are as follows:

Rubber Modified Vinyl Resin

A rubber modified polystyrene resin available from Cheil Industries Inc. (Product name: HR-1380F) was used. The particle size of butadiene rubber was 1.5 μm. The rubber content was 6.5% by weight.

Cyclic Alkyl Phosphate Compound

Antiblaze 1045 of Rhodia Co. containing 20.8% of cyclic alkyl phosphate compounds was used. The phosphate compounds included a mixture of 8% by weight of methyl-bis(5-ethyl-2-methyl-1,3,2-dioxaphorinan-5yl) methyl methyl phosphonic acid ester P-oxide and 85% by weight of methyl-bis(5-ethyl-2-methyl-1,3,2-dioxaphorinan-5yl) phosphonic acid ester P, P'-dioxide.

Aromatic Phosphate Ester Compound

Resorcinol bis(2,6-dimethylphenyl)phosphate available from Daihachi Chemical of Japan (product name: PX200) was used.

Polyphenylene Ether Resin (PPE)

A poly(2,6-dimethyl-1,4-phenylene)ether in powder form available from Asahi Co. of Japan (Product name: P-402) was used. The powder had an average particle size of several microns (μm).

Examples 1-4

The components as shown in Table 1 below were mixed and the mixture was extruded at 200-280° C. with a conventional twin screw extruder in pellets. The resin pellets were dried at 80° C. for 3 hours, and molded into test specimens using a 6 oz injection molding machine at 180-280° C. and barrel temperature of 40-80° C.

Comparative Example 1

Comparative Examples 1 was conducted in the same manner as in Example 1 except that 6 parts by weight of the cyclic alkyl phosphate compound alone was used as a flame retardant.

Comparative Examples 2-3

Comparative Examples 2-3 were conducted in the same manner as in Example 1 except that resorcinol bis(2,6-dimethylphenyl)phosphate alone was used as a flame retardant.

Comparative Example 4

Comparative Example 4 was conducted in the same manner as in Example 3 except that 6 parts by weight of resorcinol bis(2,6-dimethylphenyl)phosphate alone was used as a flame retardant.

Comparative Example 5

Comparative Example 5 was conducted in the same manner as in Example 3 except that 3 parts by weight of ring-shaped alkyl phosphonic acid ester compound alone was used as a flame retardant.

The physical properties of the specimens in the Examples 1-4 and the Comparative Examples 1-5 were measured in the following manner:

(1) Flame retardancy: The flame retardancy was measured in accordance with UL94VB with a thickness of 1/8".

(2) Izod impact strength: The notch Izod impact strength was measured in accordance with ASTM 256A (1/8" notched) at 23° C.

(3) Heat resistance: The Vicat Softening Temperature was measured in accordance with ASTM D1525 under load of 5 kg.

(4) Color and heat stability: The color stability was measured in accordance with ASTM D4459 based on cream color.

The test results are presented in Table 1.

TABLE 1

|  | Examples | | | | Comparative Examples | | | | |
| --- | --- | --- | --- | --- | --- | --- | --- | --- | --- |
|  | 1 | 2 | 3 | 4 | 1 | 2 | 3 | 4 | 5 |
| Rubber modified vinyl resin | 100 | 100 | 90 | 90 | 100 | 100 | 100 | 90 | 90 |
| Cyclic Alkyl Phosphate | 1 | 2 | 1 | 2 | 6 | — | — | — | 3 |
| Aromatic Phosphate Ester | 2 | 4 | 2 | 4 | — | 10 | 6 | 6 | — |
| PPE | — | — | 10 | 10 | — | — | — | 10 | 10 |
| UL 94 flame retardancy (1/8") | V2 | V2 | V2 | V2 | V2 | V2 | Fail | Fail | V2 |
| Izod Impact Strength (1/8") (kgf · cm/cm) | 14 | 10 | 14 | 12 | 13 | 8 | 9 | 11 | 15 |
| Vicat Softening Temperature (° C.) | 84 | 79 | 89 | 84 | 78 | 72 | 79 | 83 | 88 |
| Color and heat stability (D65 ΔE) | 0.2 | 0.3 | 0.2 | 0.35 | 0.6 | 0.5 | 0.2 | 0.2 | 0.4 |

As shown above, the resin compositions employing both the cyclic alkyl phosphate compound and the aromatic phosphate ester compound as a flame retardant show good flame retardancy and heat resistance without no deterioration of impact strength compared to those employing the cyclic alkyl phosphate compound or the aromatic phosphate ester compound alone. Thus, in some embodiments, a molded article comprising the composition can provide good physical properties when used in the production of electronic products including ultra-large-size thin films. Some embodiments have advantages in that they show excellent flame retardancy and enhanced color stability while having a good balance of properties, such as excellent impact resistance, Vicat Softening Temperature, and appearance.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A composition comprising:
   a rubber modified vinyl resin;
   a cyclic alkyl phosphate ester compound represented by Formula (I):

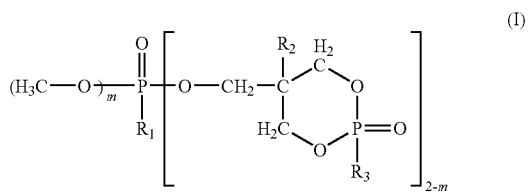

wherein $R_1$, $R_2$, and $R_3$ are independently substituted or unsubstituted $C_{1-4}$ alkyl, and
   wherein m is an integer of 0 or 1; and
   an aromatic phosphate ester compound represented by Formula (II):

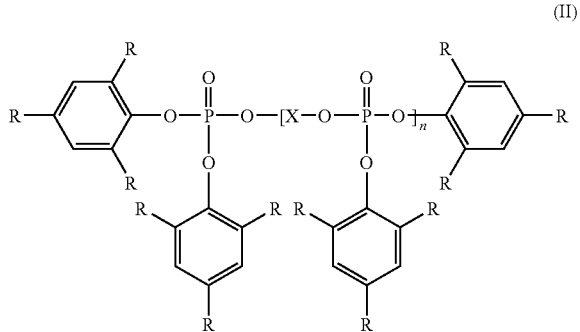

wherein R is independently hydrogen or $C_{1-4}$ alkyl,
   wherein X is derived from an aryl compound comprising one or more hydroxy groups; and
   wherein n is an integer of 0, 1, 2, 3, or 4;
   wherein the particle size of the rubber particles in the rubber modified vinyl resin is in the range from about 0.1 to about 6.0 μm (z-average).

2. The composition of claim 1, wherein the rubber modified aromatic vinyl resin is about 70 to about 100 parts by weight, the cyclic alkyl phosphate ester compound is about 0.1 to 10 parts by weight, and the aromatic phosphate ester compound is about 0.1 to about 10 parts by weight.

3. The composition of claim 1, wherein the aryl compound comprising two hydroxyl groups is selected from the group consisting of resorcinol, hydroquinone, bisphenol-A.

4. The composition of claim 1, wherein X is arylene or a compound comprising more than one aryl group.

5. The composition of claim 1, wherein the rubber modified vinyl resin is a rubber modified styrenic resin.

6. The composition of claim 1, wherein the rubber modified vinyl resin comprises a copolymer having a repeating unit of a rubber and at least one repeating unit of a monomer selected from an aromatic mono-alkenyl monomer and an alkyl ester monomer of acrylic or methacrylic acid.

7. The composition of claim 1, wherein the composition further comprises a polyphenylene ether resin.

8. The composition of claim 7, wherein the polyphenylene ether resin is about 0.1 to about 10 parts by weight, per about 70 to about 100 parts by weight of the rubber modified vinyl resin.

9. The composition of claim 1, wherein cyclic alkyl phosphate ester compound is methyl-bis(5-ethyl-2-methyl-1,3,2-dioxaphorinan-5-yl)methyl methyl phosphonic acid ester P-oxide or methyl-bis(5-ethyl-2-methyl-1,3,2-dioxaphorinan-5-yl) phosphonic acid ester P,P'-dioxide.

10. The composition of claim 1, wherein the composition is formed in a shaped article.

11. The composition of claim 7, wherein the composition is formed in a shaped article.

12. The composition of claim 10, wherein the article has a flame retardancy of V-2, V-1, or V-0 when a specimen of the article is tested under the standard UL-94VB (⅛").

13. The composition of claim 10, wherein the article has impact strength greater than or equal to about 10 kgf·cm/cm when a specimen of the article is tested under the standard ASTM D-256 A (⅛" notched) at 23° C.

14. The composition of claim 10, wherein the article has impact strength greater than or equal to about 12 kgf·cm/cm when a specimen of the article is tested under the standard ASTM D-256 A (⅛" notched) at 23° C.

15. The composition of claim 10, wherein the article has impact strength greater than or equal to about 14 kgf·cm/cm when a specimen of the article is tested under the standard ASTM D-256 A (⅛" notched) at 23° C.

16. The composition of claim 10, wherein the article has Vicat Softening Temperature greater than or equal to about 79° C. when a specimen of the article is tested under the standard ASTM D-1525 under a 5 kg load.

17. The composition of claim 10, wherein the article has Vicat Softening Temperature greater than or equal to about 84° C. when a specimen of the article is tested under the standard ASTM D-1525 under a 5 kg load.

18. The composition of claim 10, wherein the article has Vicat Softening Temperature greater than or equal to about 89° C. when a specimen of the article is tested under the standard ASTM D-1525 under a 5 kg load.

19. The composition of claim 11, wherein the article has ΔE less than about 0.4 when a specimen of the article is tested under the standard ASTM-D4459.

20. The composition of claim 1, wherein the composition is formed into a film.

21. The composition of claim 1 which contains 0 parts polyphenylene ether resin.

22. A composition comprising:
a rubber modified vinyl resin;
a cyclic alkyl phosphate ester compound represented by Formula (I):

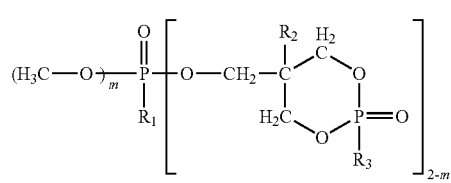

wherein $R_1$, $R_2$, and $R_3$ are independently substituted or unsubstituted $C_{1-4}$ alkyl, and
wherein m is an integer of 0 or 1; and
an aromatic phosphate ester compound represented by Formula (II):

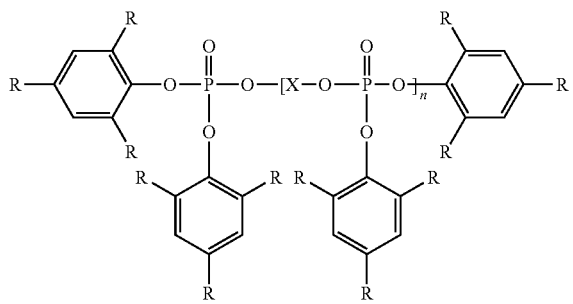

wherein R is independently hydrogen or $C_{1-4}$ alkyl, X is derived from an aryl compound comprising one or more hydroxy groups; and n is an integer of 0, 1, 2, 3, or 4; and
wherein the composition contains 0 parts polyphenylene ether resin.

* * * * *